(12) United States Patent
Beck et al.

(10) Patent No.: US 9,371,891 B2
(45) Date of Patent: Jun. 21, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/396,082

(22) PCT Filed: Mar. 13, 2013

(86) PCT No.: PCT/EP2013/055060
§ 371 (c)(1),
(2) Date: Oct. 22, 2014

(87) PCT Pub. No.: WO2013/159991
PCT Pub. Date: Oct. 31, 2013

(65) Prior Publication Data
US 2015/0126325 A1    May 7, 2015

(30) Foreign Application Priority Data

Apr. 27, 2012    (DE) .......................... 10 2012 207 043

(51) Int. Cl.
*F16H 3/66*    (2006.01)
*F16H 3/44*    (2006.01)

(52) U.S. Cl.
CPC ............ *F16H 3/66* (2013.01); *F16H 2003/445* (2013.01); *F16H 2200/0065* (2013.01);

(Continued)

(58) Field of Classification Search
CPC .................... F16H 2003/445; F16H 2003/442
USPC ........................................................... 475/271
See application file for complete search history.

(56) References Cited

U.S. PATENT DOCUMENTS 6,960,149 B2    11/2005  Ziemer
7,695,398 B2     4/2010  Phillips et al.
(Continued)

FOREIGN PATENT DOCUMENTS

DE          101 15 995 A1   10/2002
DE      10 2008 031 970 A1   1/2009
(Continued)

OTHER PUBLICATIONS

German Search Report Corresponding to 10 2012 207 031.1 mailed Dec. 19, 2012.
(Continued)

*Primary Examiner* — Justin Holmes
*Assistant Examiner* — Stacey Fluhart
(74) *Attorney, Agent, or Firm* — Davis & Bujold PLLC; Michael J. Bujold

(57) ABSTRACT

A multi-stage transmission in which carrier of first gear set is connected to ring gear of fourth gear set, ring gear of first gear set and carrier of second gear set can be coupled to housing via first brake or to drive shaft via first clutch. Sun of first gear set and sun of second gear set can be coupled to housing via second brake. Sun of third gear set and sun of fourth gear set can be coupled to housing via third brake. Drive shaft can be coupled to ring gear of second gear set via second clutch. Ring gear of third gear set and carrier of fourth gear set can be coupled to drive shaft via third clutch, and output shaft is connected to carrier of third gear set.

6 Claims, 2 Drawing Sheets

(52) U.S. Cl.
CPC . *F16H2200/0082* (2013.01); *F16H 2200/2012* (2013.01); *F16H 2200/2046* (2013.01); *F16H 2200/2094* (2013.01)

(56) References Cited

U.S. PATENT DOCUMENTS

| | | | |
|---|---|---|---|
| 8,210,981 | B2 | 7/2012 | Bauknecht et al. |
| 8,398,522 | B2 | 3/2013 | Bauknecht et al. |
| 2009/0197734 | A1 | 8/2009 | Phillips et al. |

FOREIGN PATENT DOCUMENTS

| | | |
|---|---|---|
| DE | 10 2008 038 210 A1 | 3/2009 |
| DE | 10 2008 000 428 A1 | 9/2009 |
| DE | 10 2008 000 429 A1 | 9/2009 |
| DE | 10 2008 041 196 A1 | 2/2010 |
| DE | 10 2008 041 200 A1 | 2/2010 |
| DE | 10 2008 041 209 A1 | 2/2010 |
| DE | 10 2009 020 442 A1 | 11/2010 |
| DE | 10 2009 028 670 A1 | 2/2011 |
| DE | 10 2009 047 279 A1 | 6/2011 |
| JP | 2005-083479 A | 3/2005 |
| JP | 2006-349153 A | 12/2006 |

OTHER PUBLICATIONS

German Search Report Corresponding to 10 2012 207 043.5 mailed Nov. 13, 2012.
German Search Report Corresponding to 10 2012 207 081.8 mailed Dec. 19, 2012.
German Search Report Corresponding to 10 2012 207 085.0 mailed Dec. 19, 2012.
German Search Report Corresponding to 10 2012 207 091.5 mailed Dec. 19, 2012.
German Search Report Corresponding to 10 2012 207 092.3 mailed Dec. 19, 2012.
International Search Report Corresponding to PCT/EP2013/055061 mailed May 21, 2013.
International Search Report Corresponding to PCT/EP2013/055060 mailed May 21, 2013.
International Search Report Corresponding to PCT/EP2013/055058 mailed May 21, 2013.
International Search Report Corresponding to PCT/EP2013/055057 mailed May 21, 2013.
International Search Report Corresponding to PCT/EP2013/055062 mailed May 21, 2013.
International Search Report Corresponding to PCT/EP2013/055059 mailed May 21, 2013.
Written Opinion Corresponding to PCT/EP2013/055060 mailed May 21, 2013.

| GEAR | ENGAGED SHIFT ELEMENT | | | | | | GEAR RATIO | GEAR INTERVAL |
|---|---|---|---|---|---|---|---|---|
| | BRAKE | | | CLUTCH | | | i | φ |
| | 53 | 51 | 52 | 61 | 62 | 63 | | |
| 1 | x | | x | | x | | 4.141 | |
| | | | | | | | | 1.620 |
| 2 | x | | x | x | | | 2.556 | |
| | | | | | | | | 1.434 |
| 3 | x | | | x | x | | 1.783 | |
| | | | | | | | | 1.325 |
| 4 | x | | | x | | x | 1.345 | |
| | | | | | | | | 1.345 |
| 5 | | | | x | x | x | 1.000 | |
| | | | | | | | | 1.239 |
| 6 | | | x | x | | x | 0.807 | |
| | | | | | | | | 1.170 |
| 7 | | | x | | x | x | 0.690 | |
| | | | | | | | | 1.234 |
| 8 | | x | x | | | x | 0.559 | |
| | | | | | | | | 1.215 |
| 9 | | x | | | x | x | 0.460 | |
| R | x | x | | | x | | -3.650 | TOTAL 9 |
| M | x | | | x | | x | 1.345 | |
| M | x | | x | | | x | 1.345 | |
| M | x | x | | | | x | 1.345 | |

MULTI-SPEED GEARBOX

This application is a National Stage completion of PCT/EP2013/055060 filed Mar. 13, 2013, which claims priority from German patent application serial no. 10 2012 207 043.5 filed Apr. 27, 2012.

FIELD OF THE INVENTION

The invention relates to a multi-stage transmission in planetary design, in particular for a motor vehicle.

BACKGROUND OF THE INVENTION

Such multi-stage transmissions are preferably used as automatic transmissions of motor vehicles, wherein the power flow within the planetary sets that is active in the respective gear step is defined by a targeted actuation of the shift elements. In an automatic transmission, the planetary sets are usually also connected to a start-up element, such as for example a hydrodynamic torque converter or a hydraulic clutch, which is subject to a slip effect and which is provided optionally with a bypass clutch.

There is known from DE 10 2008 000 428 A1 a multi-stage transmission in planetary design, in which there are arranged in a housing four planetary sets as well as a total of eight rotatable shafts, of which one is the drive shaft and another is the output shaft of the multi-stage transmission. Furthermore, there are provided in the region of the shafts at least six shift elements, the targeted actuation of which serves to vary the power flow within the four planetary sets and thus to define different transmission ratios between the drive shaft and the output shaft. As a result, it is possible to shift a total of nine forward gears and one reverse gear.

SUMMARY OF THE INVENTION

The problem addressed by the invention is that of specifying an alternative multi-stage transmission, preferably with an improved efficiency and with a transmission ratio range that is sufficiently large and sufficiently uniformly distributed.

The problem addressed by the invention is solved by a multi-stage transmission comprising at least four planetary gear sets, a housing, a drive shaft and an output shaft, wherein
- a carrier of a first planetary gear set is permanently connected to a ring gear of a fourth planetary gear set,
- a ring gear of the first planetary gear set and a carrier of a second planetary gear set can be coupled to the housing, via a first brake, or to the drive shaft, via a first clutch,
- a sun gear of the first planetary gear set and a sun gear of the second planetary gear set can be coupled to the housing, via a second brake,
- a sun gear of a third planetary gear set and a sun gear of the fourth planetary gear set can be coupled to the housing, via a third brake,
- the drive shaft can be coupled to a ring gear of the second planetary gear set, via a second clutch,
- a ring gear of the third planetary gear set and a carrier of the fourth planetary gear set can be coupled to the drive shaft, via a third clutch, and
- the output shaft is permanently connected to a carrier of the third planetary gear set.

A planetary gear set is understood to mean, in particular, a gear set which comprises at least one sun gear with which one or more planetary gears mesh, a carrier which determines the axes of the planetary gears, and a ring gear with which the planetary gears mesh. Preferably the ring gear has an inner gearing and the sun gear has an outer gearing.

One advantage of the invention may be that the shift elements of the multi-stage transmission, that is to say the brakes and the clutches of the transmission, can easily be reached from outside. The actuators, such as for example electric motors, hydraulic valves, hydraulic pumps and the like, can thus be arranged in the vicinity of the shift elements, as a result of which mechanical and/or hydraulic losses are reduced and less energy may be required for actuating the shift elements. Less energy may also be required in order to keep the shift element in its respective current operating state, that is to say engaged or disengaged, for example, since the pressure losses are also lower due to short lines. It is thus also possible to arrange shift elements on the housing and thus at least partially in a rotationally fixed manner, as a result of which seals which connect a stationary line to a rotating line can be entirely or partially avoided.

The spatial arrangement of the easily reachable shift elements also makes it easier to replace the lamellar clutches or brakes, which are usually actuated hydraulically, with for example brakes and clutches which are actuated electromechanically or electrohydraulically and which can be actuated comparatively easily according to demand. Easily reachable shift elements are, on the one hand, brakes, which couple a shaft to the housing in a rotationally fixed manner, but also shift elements on outer shafts of the multi-stage transmission, preferably on the drive shaft or output shaft, which can be supplied in a comparatively easy manner with the hydraulic fluid that is necessary for actuation.

Besides this property, the multi-stage transmission also has a good gearing efficiency, only small loads on the components, in particular low planetary set and shift element torques, low absolute and relative speeds of rotation and/or a low construction complexity. The latter makes it possible to implement the multi-stage transmission with only low weight and low costs. Finally, the multi-stage transmission also permits a good transmission ratio range, that is to say a highly practical stepping of the gears.

In general, one preferred embodiment of the multi-stage transmission comprises four planetary gear sets, three clutches, three brakes and no fixed housing coupling.

By actuating two shift elements (brakes and/or clutches), in each case, nine forward gears and one reverse gear can be shifted, three further alternative shift positions are available for the fourth gear.

As start-up elements, use may be made of a hydrodynamic torque converter, a hydrodynamic clutch, an additional start-up clutch, an integrated start-up clutch or brake and/or an additional electric machine.

In principle, an electric machine or another power source can be arranged on each shaft. In principle, a freewheel to the housing or to another shaft can also be arranged on each shaft.

The multi-stage transmission is preferably implemented as a standard drive, but a front-transverse design is also conceivable.

All the shift elements can act in a friction-locking or a form-locking manner. Preferably, however, the third brake can be configured as a form-locking shift element, in particular, as a claw clutch, which leads to a considerably improved efficiency and thus to considerable advantages in terms of fuel consumption.

It has been found that the third brake has to be actuated just once when shifting from the first to the ninth gear. This shift element is therefore particularly suitable for being configured as a claw clutch. It has also been found that for this shift element, due to its comparatively seldom actuation, the advantage of better efficiency outweighs the disadvantage of more difficult handling. In particular, it has been found that the actuation of this shift element can take place at a relatively high gear, as a result of which the difference in the speed of rotation of the shafts may be low and thus is favorable for the actuation of a claw clutch.

The geometric position, in particular the order, of the individual gear sets and shift elements can be selected freely, as long as it permits the connection of the elements. The position of individual elements can thus be moved at will.

Further advantageous variants of the multi-stage transmission emerge from the dependent claims and also from the description in conjunction with the figures. In terms of function, these all have the same properties as the main system, in particular similar efficiency, similar stepping, etc.

BRIEF DESCRIPTION OF THE DRAWINGS

For the sake of better understanding of the invention, they will be explained in more detail with reference to the following figures.

In the figures, which each show a highly schematic, simplified representation.

DETAILED DESCRIPTION OF THE PREFERRED EMBODIMENTS

The position details selected in the description such as, for example, top, bottom, side, etc., are based on the figure that is being directly described and shown and, in the event of a change in position, are correspondingly transferred to the new position. Furthermore, individual features or combinations of features from the example embodiment that is shown and described can also represent stand-alone inventive solutions or solutions according to the invention.

Figures 1, 2:
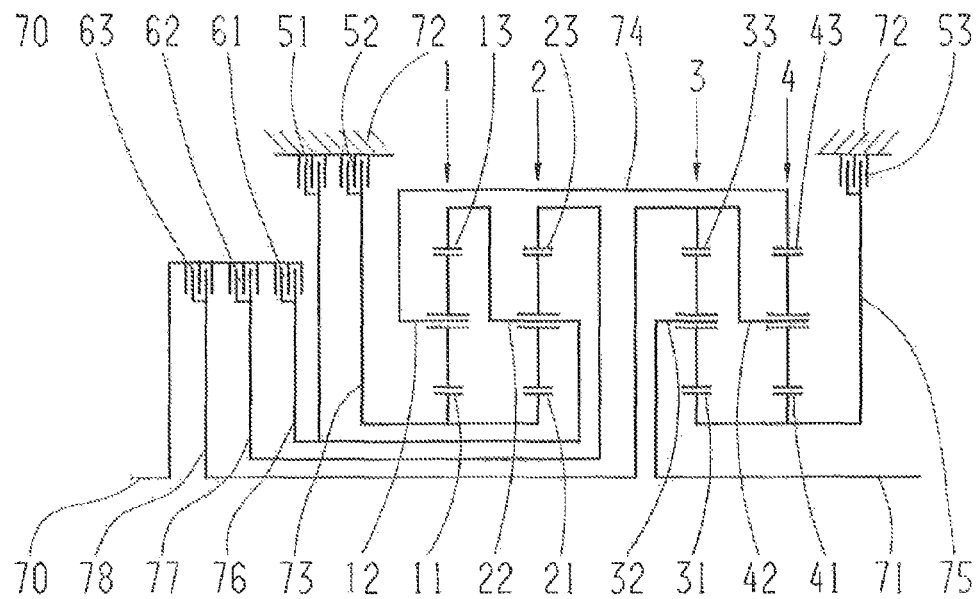
FIG. 1 shows a first example variant of a multi-stage transmission, shown schematically, according to the invention.
FIG. 2 shows a table indicating the engaged shift elements in each gear step for the transmission variant shown in FIG. 1.
Figure 1A:
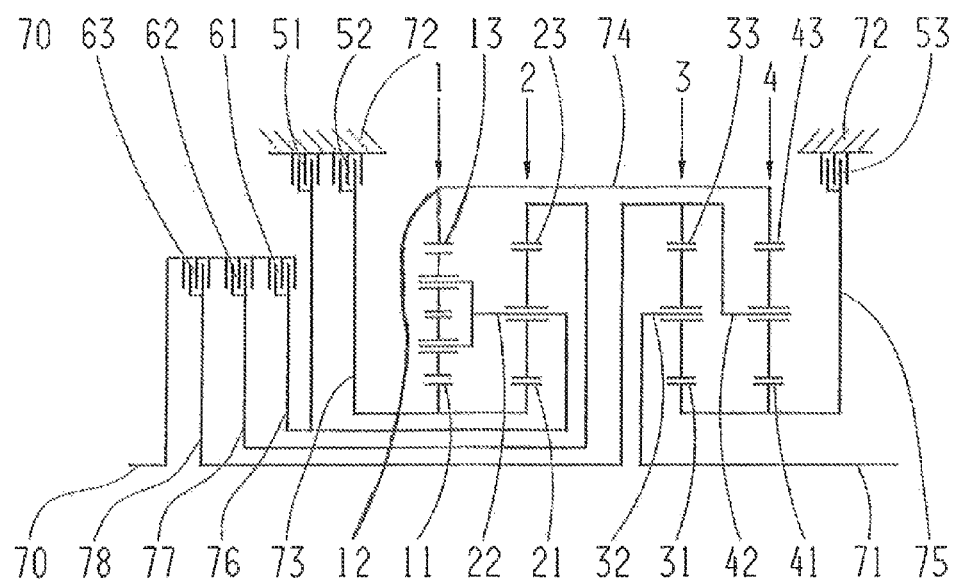

FIG. 1 shows a multi-stage transmission comprising four planetary gear sets 1, 2, 3, 4, a drive shaft 70, an output shaft 71, six further rotatable shafts 73, 74, 75, 76, 77, 78, and six shift elements 51, 52, 53, 61, 62, 63, of which three are brakes 51, 52, 53 and three are clutches 61, 62, 63. The four planetary gear sets 1, 2, 3, 4 are arranged, one behind, the other in the following order: first planetary gear set 1, second planetary gear set 2, third planetary gear set 3, fourth planetary gear set 4. The first planetary gear set 1, the second planetary gear set 2, the third planetary gear set 3 and the fourth planetary gear set 4 are configured as minus planetary gear sets. The planetary gear sets 1, 2, 3, 4 are jointly enclosed by a housing 72. In the variant of the multi-stage transmission of FIG. 1:

a carrier 12 of a first planetary gear set 1 is permanently connected to a ring gear 43 of a fourth planetary gear set 4, a ring gear 13 of the first planetary gear set 1 and a carrier 22 of a second planetary gear set 2 can be coupled to the housing 72, via a first brake 51, or to the drive shaft 70, via a first clutch 61, a sun gear 11 of the first planetary gear set 1 and a sun gear 21 of the second planetary gear set 2 can be coupled to the housing 72, via a second brake 52, a sun gear 31 of a third planetary gear set 3 and a sun gear 41 of the fourth planetary gear set 4 can be coupled to the housing 72, via a third brake 53, the drive shaft 70 can be coupled to a ring gear 23 of the second planetary gear set 2, via a second clutch 62, a ring gear 33 of the third planetary gear set 3 and a carrier 42 of the fourth planetary gear set 4 can be coupled to the drive shaft 70, via a third clutch 63, the output shaft 71 is permanently connected to a carrier 32 of the third planetary gear set 3.

In the multi-stage transmission shown in FIG. 1, the following gears can be shifted:

A first gear can be achieved by the engaged second brake 52, the engaged third brake 53 and the engaged second clutch 62.

A second gear can be achieved by the engaged second brake 52, the engaged third brake 53 and the engaged first clutch 61.

A third gear can be achieved by the engaged third brake 53, the engaged first clutch 61 and the engaged second clutch 62.

A fourth gear can be achieved by the engaged third brake 53, the engaged first clutch 61 and the engaged third clutch 63, or by the engaged third brake 53, the engaged second clutch 62 and the engaged third clutch 63, or by the engaged second brake 52, the engaged third brake 53 and the engaged third clutch 63, or by the engaged first brake 51, the engaged third brake 53 and the engaged third clutch 63.

A fifth gear can be achieved by the engaged first clutch 61, the engaged second clutch 62 and the engaged third clutch 63.

A sixth gear can be achieved by the engaged second brake 52, the engaged first clutch 61 and the engaged third clutch 63.

A seventh gear can be achieved by the engaged second brake 52, the engaged second clutch 62 and the engaged third clutch 63.

An eighth gear can be achieved by the engaged first brake 51, the engaged second brake 52 and the engaged third clutch 63.

A ninth gear can be achieved by the engaged first brake 51, the engaged second clutch 62 and the engaged third clutch 63.

A reverse gear can be achieved by the engaged first brake 51, the engaged third brake 53 and the engaged second clutch 62.

In each case, the shift elements that are not mentioned are disengaged.

This is also shown in the table in FIG. 2, which also shows the transmission ratios of the respective gear steps.

In the illustrated multi-stage transmissions, preferably all the gear sets 1, 2, 3, 4 are configured as minus gear sets.

In one advantageous variant, the transmission ratio:

of the first gear set 1, between the sun gear 11 and the ring gear 13, is −2.303 and/or of the second gear set 2, between the sun gear 21 and the ring gear 23, is −1.613 and/or of the third gear set 3, between the sun gear 31 and the ring gear 33, is −2.899 and/or of the fourth gear set 4, between the sun gear 41 and the ring gear 43, is −3.074.

In general, instead of a first specified connection/coupling to a carrier 12, 22, 32, 42 of a gear set 1, 2, 3, 4 and a second specified connection/coupling to a ring gear 13, 23, 33, 43 of this gear set 1, 2, 3, 4, the first specified connection/coupling is formed to said ring gear 13, 23, 33, 43 of this gear set 1, 2, 3, 4 and the second specified connection/coupling is formed to said carrier 12, 22, 32, 42 of this gear set 1, 2, 3, 4, wherein this gear set 1, 2, 3, 4 is configured as a plus gear set instead of as a minus gear set and as a minus gear set instead of as a plus gear set, respectively. In other words, the connections/ couplings to the carrier 12, 22, 32, 42 and to the ring gear 13, 23, 33, 43 of a gear set 1, 2, 3, 4 are swapped and the direction of rotation between the sun gear 11, 21, 31, 41 and the ring gear 13, 23, 33, 43 of this gear set 1, 2, 3, 4 is reversed. When designing the multi-stage transmission, care should additionally be taken to ensure that the value of the stationary transmission ratio of this gear set is increased or decreased by 1 if the shiftable transmission ratios between the input drive 70 and the output drive 71 are otherwise to remain the same. By varying the gear sets 1, 2, 3, 4 in the specified manner, therefore, the connection/coupling between the individual transmission elements can be changed without changing the characteristic of the transmission. A large number of design embodiments are thus available which may simplify the implementation of the transmission in the case in question. The aforementioned swapping of the connection/coupling is not limited to one gear set 1, 2, 3, 4 but rather can also be applied simultaneously to a plurality of gear sets 1, 2, 3, 4.

The example embodiments show possible variant embodiments of a multi-stage transmission, according to the invention, wherein it should be noted at this point that the invention is not limited to the specifically shown variant embodiments thereof, but rather various combinations of the individual variant embodiments with one another are also possible, and this possibility for variation based on the technical teaching of the present invention lies within the capability of a person skilled in the art operating in this technical field. In particular, the possibilities which are obvious from the combinatorics, but which are not explicitly shown in the figures, are also covered by the scope of protection. In addition, all conceivable variant embodiments which are possible through combinations of individual details of the variant embodiment that has been shown and described are also covered by the scope of protection.

As a matter of form, it should finally be pointed out that, for a better understanding of the structure of the multi-stage transmission, the latter is shown schematically in the figures and, therefore, in reality may comprise more components than shown, fewer components than shown, or also other components. In general, the specific design lies within the capability of a person skilled in the art.

The problem addressed by the stand-alone inventive solutions can be found in the description.

LIST OF REFERENCE CHARACTERS 1 first transmission gear set
2 second transmission gear set
3 third transmission gear set
4 fourth transmission gear set
11 sun gear of the first transmission gear set
12 carrier of the first transmission gear set
13 ring gear of the first transmission gear set
21 sun gear of the second transmission gear set
22 carrier of the second transmission gear set
23 ring gear of the second transmission gear set
31 sun gear of the third transmission gear set
32 carrier of the third transmission gear set
33 ring gear of the third transmission gear set
41 sun gear of the fourth transmission gear set
42 carrier of the fourth transmission gear set
43 ring gear of the fourth transmission gear set
51 first brake
52 second brake
53 third brake
61 first clutch
62 second clutch
63 third clutch
70 input drive
71 output drive
72 housing
73, 74, 75, 76, 77, 78, shaft

The invention claimed is:

1. A multi-stage transmission comprising:
   at least four planetary gear sets (1, 2, 3, 4),
   a housing (72),
   a drive shaft (70), and
   an output shaft (71),
   wherein a carrier (12) of a first planetary gear set (1) is permanently connected to a ring gear (43) of a fourth planetary gear set (4),
   a ring gear (13) of the first planetary gear set (1) and a carrier (22) of a second planetary gear set (2) can both be directly coupled to either the housing (72), via a first brake (51), or directly coupled to the drive shaft (70), via a first clutch (61),
   a sun gear (11) of the first planetary gear set (1) and a sun gear (21) of the second planetary gear set (2) can be coupled to the housing (72), via a second brake (52),
   a sun gear (31) of a third planetary gear set (3) and a sun gear (41) of the fourth planetary gear set (4) can be coupled to the housing (72), via a third brake (53), the drive shaft (70) can be coupled to a ring gear (23) of the second planetary gear set (2), via a second clutch (62),
   a ring gear (33) of the third planetary gear set (3) and a carrier (42) of the fourth planetary gear set (4) both can be coupled to the drive shaft (70), via a third clutch (63),
   the output shaft (71) is permanently connected to a carrier (32) of the third planetary gear set (3), and
   a first gear stage is achieved by engagement of the second brake (52), the third brake (53) and the second clutch (62),
   a second gear stage is achieved by engagement of the second brake (52), the third brake (53) and the first clutch (61),
   a third gear stage is achieved by engagement of the third brake (53), the first clutch (61) and the second clutch (62),
   a fourth gear stage is achieved by only one of:
      a) engagement of the third brake (53), the first clutch (61) and the third clutch (63),
      b) engagement of the third brake (53), the second clutch (62) and the third clutch (63),
      c) engagement the second brake (52), the third brake (53) and the third clutch (63), or
      d) engagement of the first brake (51), the third brake (53) and the third clutch (63),
   a fifth gear stage is achieved by engagement of the first clutch (61), the second clutch (62) and the third clutch (63),
   a sixth gear stage is achieved by engagement of the second brake (52), the first clutch (61) and the third clutch (63),
   a seventh gear stage is achieved by engagement of the second brake (52), the second clutch (62), and the third clutch (63),
   an eighth gear stage is achieved by engagement of the first brake (51), the second brake (52) and the third clutch (63),
   a ninth gear stage is achieved by engagement of the first brake (51), the second clutch (62) and the third clutch (63), and
   a reverse gear stage is achieved by engagement of the first brake (51), the third brake (53) and the second clutch (62).

2. The multi-stage transmission according to claim 1, wherein all the gear sets (1, 2, 3, 4) are configured as minus gear sets.

3. The multi-stage transmission according to claim 2, wherein the multi-stage transmission has at least one of the following:
a transmission ratio of −2.303 for the first gear set (1) between the sun gear (11) and the ring gear (12),
a transmission ratio of −1.613 for the second gear set (2) between the sun gear (21) and the ring gear (22),
a transmission ratio of −2.899 for the third gear set (3) between the sun gear (31) and the ring gear (32), and
a transmission ratio of −3.074 for the fourth gear set (4) between the sun gear (41) and the ring gear (42).

4. The multi-stage transmission according to claim 1, wherein the first brake (53) is configured as a claw clutch.

5. A multi-stage transmission comprising:
at least four planetary gear sets,
a housing,
a drive shaft, and
an output shaft,
wherein a carrier of a first planetary gear set is permanently connected to a ring gear of a fourth planetary gear set,
a ring gear of the first planetary gear set and a carrier of a second planetary gear set are both directly coupled to either the housing, via engagement of a first brake, or to the drive shaft, via engagement of a first clutch,
a sun gear of the first planetary gear set and a sun gear of the second planetary gear set can both be directly coupled to the housing, via engagement of a second brake,
a sun gear of a third planetary gear set and a sun gear of the fourth planetary gear set can both be directly coupled to the housing, via engagement of a third brake,
the drive shaft can be coupled to a ring gear of the second planetary gear set, via engagement of a second clutch,
a ring gear of the third planetary gear set and a carrier of the fourth planetary gear set can both be coupled to the drive shaft, via engagement of a third clutch,
the output shaft is permanently connected to a carrier of the third planetary gear set, and
a first gear is achieved by engagement of the second brake, the third brake and the second clutch,
a second gear is achieved by engagement of the second brake, the third brake and the first clutch,
a third gear is achieved by engagement of the third brake, the first clutch and the second clutch,
a fourth gear is achieved by only one of:
  a) engagement of the third brake, the first clutch and the third clutch,
  b) engagement of the third brake, the second clutch and third clutch,
  c) engagement of the second brake, the third brake and the third clutch, or
  d) engagement of the first brake, the third brake and the third clutch,
a fifth gear is achieved by engagement of the first clutch, the second clutch and the third clutch,
a sixth gear is achieved by engagement of the second brake, the first clutch and the third clutch,
a seventh pear is achieved by engagement of the second brake, the second clutch and the third clutch,
an eighth gear is achieved by engagement of the first brake, the second brake and the third clutch,
a ninth gear is achieved by engagement of the first brake, the second clutch and the third clutch, and
a reverse gear is achieved by engagement of the first brake, the third brake and the second clutch.

6. A multi-stage transmission comprising:
at least first, second, third and fourth planetary gear sets and each of the first, the second, the third and the fourth planetary gear sets comprising a first element, a second element and a third element,
a housing;
a drive shaft; and
an output shaft;
wherein the second element of the first planetary gear set is permanently connected to the third element of the fourth planetary gear set;
the third element of the first planetary gear set and the second element of the second planetary gear set are both directly coupled to either the housing, via engagement of a first brake, or directly coupled to the drive shaft, via engagement of a first clutch;
the first element of the first planetary gear set and the first element of the second planetary gear set can both be directly coupled to the housing, via engagement of a second brake;
the first element of the third planetary gear set and the first element of the fourth planetary gear set can both be directly coupled to the housing, via engagement of a third brake;
the drive shaft can be coupled to the third element of the second planetary gear set, via engagement of a second clutch;
the third element of the third planetary gear set and the second element of the fourth planetary gear set can both be coupled to the drive shaft, via engagement of a third clutch;
the output shaft is permanently connected to the second element of the third planetary gear set;
the first element of each of the first, the second, the third and the fourth planetary gear sets is a sun gear,
  the first, the second, the third and the fourth planetary gear sets which are configured either as minus gear sets or plus gear sets, if the first, the second, the third and the fourth planetary gear sets are minus gear sets, then the second element of each of the planetary gear sets is a carrier and the third element of each of the planetary gear sets is a ring gear;
  and
a first gear is achieved by engagement of the second brake, the third brake and the second clutch,
a second gear is achieved by engagement of the second brake, the third brake and the first clutch,
a third gear is achieved by engagement of the third brake, the first clutch and the second clutch,
a fourth gear is achieved by only one of:
  a) engagement of the third brake, the first clutch and the third clutch,
  b) engagement of the third brake, the second clutch and the third clutch,
  c) engagement of the second brake, the third brake and the third clutch, or
  d) engagement of the first brake, the third brake and the third clutch,
a fifth gear is achieved by engagement of the first clutch, the second clutch and the third clutch,
a sixth gear is achieved by engagement of the second brake, the first clutch and the third clutch,
a seventh gear is achieved by engagement of the second brake, the second clutch and the third clutch,
an eighth gear is achieved by engagement of the first brake, the second brake and the third clutch, a ninth gear is achieved by engagement of the first brake, the second clutch and the third clutch, and a reverse gear is achieved by engagement of the first brake, the third brake and the second clutch.

* * * * *